United States Patent [19]

Eastham et al.

[11] Patent Number: 5,968,460
[45] Date of Patent: *Oct. 19, 1999

[54] PROCESS FOR INJECTING PARTICULATE MATERIAL INTO A FLUIDIZED BED REACTOR

[75] Inventors: Donald H. Eastham, Victoria, Tex.; Ted M. Knowlton, Willowbrook, Ill.; Melvyn B. Pell; James W. Reeves, both of Wilmington, Del.

[73] Assignee: E. I. du Pont de Nemours and Company, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/623,071

[22] Filed: Mar. 28, 1996

[51] Int. Cl.⁶ .............................. C22B 34/00; C22B 1/00
[52] U.S. Cl. ...................................... 423/74; 423/DIG. 16
[58] Field of Search .............................. 423/74, DIG. 16, 423/148; 34/371, 591; 422/145

[56] References Cited

U.S. PATENT DOCUMENTS

| 4,591,334 | 5/1986 | Brooks | 432/15 |
| 4,738,828 | 4/1988 | Brooks | 422/142 |
| 4,860,694 | 8/1989 | Walker | 110/245 |
| 5,175,943 | 1/1993 | Eastham et al. | 110/106 |
| 5,320,815 | 6/1994 | Abed et al. | 423/422 |
| 5,325,603 | 7/1994 | Eastham et al. | 110/106 |

OTHER PUBLICATIONS

R.A.Sauer, I.H. Chan, T. M. Knowlton, "The Effects of System and Geometrical Parameters on the Flow of Class–B Solids in Overflow Standpipes", American Institute of Chemical Engineers Symposium Series, vol. 80, No. 234, (1983), no month.

D. Geldart, Types of Gas Fluidization, *Powder Technology,* 7, 285–292, 1973, no month.

*Primary Examiner*—Steven Bos

[57] ABSTRACT

The present invention is a process for feeding particulate material to a fluidized bed reactor operated at greater than atmospheric through a standpipe wherein the ratio of the absolute pressure where the standpipe enters the fluidized bed reactor to the absolute pressure where the particulate material enters the standpipe is at least about 1.5 and gas is injected into the standpipe at a velocity which is about 20–80 percent of the minimum fluidization velocity of the particulate material.

7 Claims, 1 Drawing Sheet

5,968,460

PROCESS FOR INJECTING PARTICULATE MATERIAL INTO A FLUIDIZED BED REACTOR

BACKGROUND OF THE INVENTION

This invention relates to an improved method for injecting particulate material into a fluidized bed reactor.

Fluidized bed processes are used commercially for the chlorination of titanium containing materials, ore roasting or refining, petroleum processing and refining, combustion of solid carbonaceous material such as coal, etc.

In such processes, particulate material, a suitable fluidizing gas such as air, oxygen or other oxidizing agents are fed into a reaction chamber, and the desired temperature and pressure are maintained. As necessary, the flow rates are adjusted so that the particulate material becomes fluidized, i.e., it is maintained in a state of suspension and has the appearance of boiling.

A good example of a commercial fluidized bed process is that for chlorinating titanium containing material. In such process, particulate coke, particulate titanium containing material, chlorine and optionally oxygen or air are fed into a reaction chamber, and a suitable reaction temperature, pressure and flow rates are maintained to sustain the fluidized bed. Gaseous titanium tetrachloride and other metal chlorides are exhausted from the reactor chamber. The gaseous titanium tetrachloride so produced can then be separated from the other metal chlorides and used to produce titanium dioxide pigment or titanium metal.

Fluidization has many advantages, but also can present certain problems. For example, if the particle size distribution is wide, a gas flow sufficient to fluidize the large particles may blow unreacted small particles out of the fluidized bed. Conversely, a gas flow just sufficient to fluidize the fine particles may not be sufficient to fluidize the large particles. Commonly used pneumatic feed, where significant amounts of air or other gas is used to transport the particulate materials to the fluidized bed reactor, can also be a problem. For example, the air or gas injected can aggravate the problem of fines being blown out of the reactor.

Another problem is that many industrial fluidized beds are operated at greater than atmospheric pressure. To inject the particulate material into such beds, there is often used pneumatic feed and/or a mechanical injection device such as a screw feeder. The pneumatic feed is undesirable because of the reasons previously mentioned. In addition, the mechanical feed devices are undesirable because they can have significant wear and maintenance costs.

The following information is disclosed that may be of interest to this invention: U.S. Pat. No. 5,320,815 discloses a process for feeding fine, particulate material to a fluidized bed. U.S. Pat. Nos. 5,325,603 and 5,175,943 disclose a process and an apparatus for feeding particulate material to a fluidized bed reactor. "Effects of System and Geometrical Parameters on the Flow of Class B Solids in Overflow Standpipes, R. A. Sauer", I. H. Chan, and T. M. Knowlton, American Institute of Chemical Engineers Symposium Series No. 234, Vol. 80, (1983) discloses various parameters for operating standpipes.

SUMMARY OF THE INVENTION

In accordance with this invention there is provided:
A process for feeding particulate material to a fluidized bed reactor comprising:
(a) feeding said particulate material to a device that mixes and aerates the particulate material;
(b) passing the particulate material downward from the device to a fluidized bed reactor by means of a standpipe, said standpipe having a bend before the particulate material is introduced into the fluidized bed reactor, said bend having an angle greater than the angle of repose of the particulate material; and
(c) injecting gas into the particulate material at one or more locations before the bend in the standpipe, said injecting being made in an amount sufficient to decrease the relative gas-solids velocity in the standpipe so that fluidization of the particulate material is prevented.

It has been found that the process of this invention can inject particulate material into a fluidized bed without the use of a mechanical feed device. The process of this invention can also inject particulate material into a fluidized bed without the addition of significant amounts of gas or air and without conveying the particulate material pneumatically. Furthermore, the process of this invention is especially useful for feeding particulate materials to fluidized bed reactors operating at greater than atmospheric pressure.

BRIEF DESCRIPTION OF THE DRAWING

Reference is made to FIG. 1, which discloses an embodiment of this invention. It is used to feed a simulated fluidized bed reactor described in the Example.

DETAILED DESCRIPTION OF THE INVENTION

Fluidized Bed Reactor and Particulate Material

Figure 1:
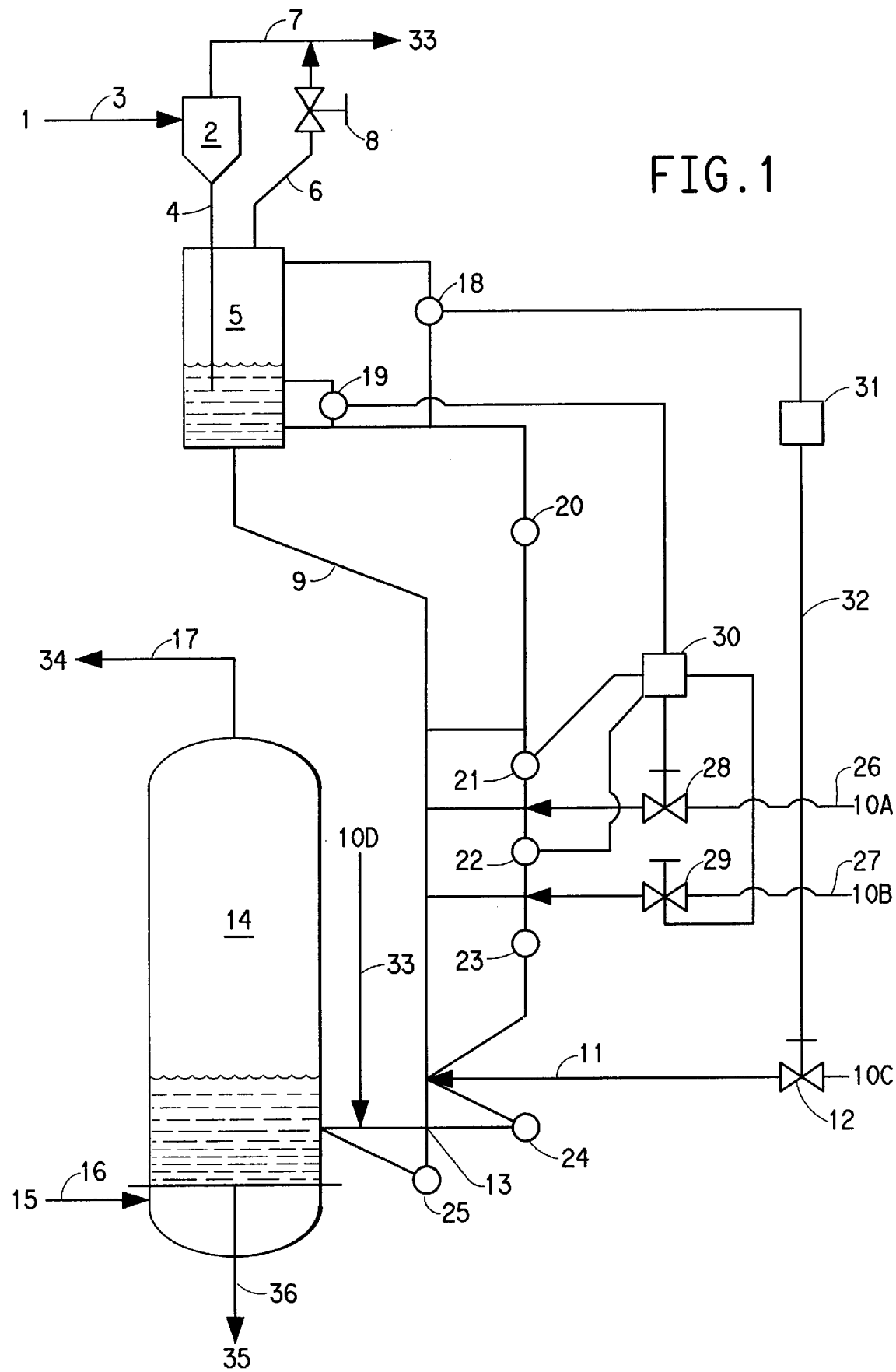

By fluidized bed reactor is meant any fluidized bed where chemical reactions, physical processing, mixing, contacting or transferring takes place. Examples of fluidized bed reactors that can utilize the concept of this invention include combustion of carbonaceous material (such as coal, wood, peat, etc.); ore refining or roasting (such as chlorination of titanium containing material); processing of metallic ores including those containing zinc, cooper or iron; and petroleum processing. The process of this invention is especially useful for introducing particulate material into fluidized bed reactors that are operating at greater than atmospheric pressure.

The particulate material can have any particle size range that functions satisfactorily in the process of this invention. Typically, the particulate material will have a particle size of about 1–5000 microns. Often, the mean particle size will be about 100–500 microns. If particulate material is used that has a particle size of about 1–50 microns, then preferably it will not exceed 50 percent by weight of the total amount of particulate material.

Preferably, the particulate material will be Type B, as defined by D. Geldart, Types of Fluidization, Powder Technology, Volume 7, pages 285–292 (1973), which is hereby incorporated by reference. Typically, such particulate material is bubbly and behaves similarly to beach sand. Dense particulate materials such as glass, sand, ore and light particles over about 150 microns are likely to be Type B. Such particles display essentially no cohesive properties; therefore, once the minimum fluidization velocity is exceeded, most of the excess gas appears in the form of gas bubbles. See also chapter 1, page 3–4 of Gas Fluidization by M. Pell, which is volume 8 of the Handbook of Powder Technology, published by Elsevier in 1990. This publication is also hereby incorporated by reference.

The fluidized bed process for combusting carbonaceous material is known and is described, for example, in the text "Fluidized Beds, Combustion and Applications", edited by J. R. Howard and published by Applied Science Publishers in 1983. Such text is hereby incorporated by reference. Particulate limestone can also be included in the fluidized bed to control the emission of sulfur oxides and/or other pollutants.

The fluidized bed process for roasting zinc ores is described in the article entitled, "Fluidized Bed Behavior in Zinc Roasters", by N. J. Themelis and G. M. Freeman in the August 1984 issue of the Journal of Metals. It is hereby incorporated by reference. Similar processes can be used to roast other metallic bearing ores.

The fluidized bed process for chlorinating titanium containing ore is known and is described, for example, in U.S. Pat. No. 2,701,179 and in the article "Fluidized Bed Chlorination of Rutile", by J. Glasser and W. L. Robinson, Society of Mining Engineers of AIME, Sep. 9, 1962. Both such patent and article are hereby incorporated by reference.

Typical conditions for commercial fluidized beds for chlorinating titanium containing material are as follows: reaction temperature of about 900°–1300° C., pressure of about 1.5–3 atmospheres, reactor size of about 6–25 feet in diameter with multiple chlorine jets in the base, reactor superficial velocity of about 0.5–1.5 feet per second, and a settled bed depth of about 6–25 feet. Typically, the titanium containing material initially fed has a particle size of about 50–800 microns in diameter and the coke initially fed has a particle size of about 300–3000 microns in diameter. If desired, up to about 50 percent of coke and/or ore particulate material can have a particle size of less than 50 microns. Often the mean particle size of the coke and ore blend fed to the reactor will be about 100–500 microns.

The titanium containing material can be any suitable titanium-bearing source material such as titanium containing ores including rutile, ilmenite or anatase ore; beneficiates thereof; titanium containing by-products or slags; and mixtures thereof.

Suitable coke for use in the fluidized bed process for chlorinating titanium containing material is any particulate carbonaceous material that has been subjected to a coking process. Preferred is coke or calcined coke that is derived from petroleum or coal or mixtures of such cokes.

Fluidized bed reactors for petroleum refining and processing are well known and are set forth for example in U.S. Pat. Nos. 3,850,582; 2,892,773; 2,881,133; 4,774,299; and 2,905,635. The disclosures of such patents are hereby incorporated by reference.

Mixing and Fluidizing Device

In step (a) of the process of this invention there is used a device that mixes or aerates the particulate material. Suitable devices include fluidized beds and cyclones. Preferred is a fluidized bed. Preferably, such fluidized bed will use a fluidization velocity of about 300–500 percent of the minimum fluidization velocity of the particulate material.

Standpipe

In regard to the standpipe, preferably it will be substantially vertical. However, it can be disposed at any angle that still permits the particulate material to flow satisfactorily. Often the standpipe will have an angle from the vertical of about 45 degrees or less.

At a location before the particulate material is fed to the fluidized bed reactor, the standpipe will have a bend having an angle greater than the angle of repose of the particulate material. Often the bend will be in the shape of an "L", "J" or "U" bend. An "L" bend is a 90 degree bend or substantially a 90 degree bend from the vertical. A "J" bend is a bend between about 90 degrees and 180 degrees from vertical. A "U" bend is a 180 degree bend or substantially a 180 degree bend from the vertical.

Gas will be injected into the particulate material at one or more locations on the standpipe before the bend and preferably at two or more locations on the standpipe before the bend. It should be noted that two or more gas injection points often will be desirable if the standpipe has significant height, e.g., if it has a height of at least 20–50 feet. The reason for this is that at such heights, the relative gas-solids velocity in the standpipe will be higher at the lower portion of the standpipe due to the gas being compressed at the lower portion of the standpipe. Therefore, with higher standpipes, preferably 3 or more, and most preferably 4 or more, injection points often will be desirable to ensure that fluidization is essentially avoided over the entire height of the standpipe.

The injected gas should be in an amount sufficient to decrease the relative gas-solids velocity in the standpipe so that fluidization of the particulate material is prevented. Often, the amount of the gas injected will be such that it causes the relative gas-solids velocity in the standpipe to be less than about 95 percent, and preferably about 20–80 percent of the minimum fluidization velocity.

Preferably, there will be a substantial absence of upward flowing gas bubbles in the standpipe, and the standpipe will not be operated in fluidized bed mode. In addition, preferably, the downward flow of the particulate material in the standpipe is in packed bed mode. Moreover, preferably, at least one location for injecting gas is upstream of the bend in the standpipe at a distance not to exceed the length of the inside diameter of the standpipe.

Methods are known to determine a suitable length for a standpipe. A suitable means is to determine the total pressure drop, i.e., differential pressure, required from the top of the standpipe to the point where the standpipe enters the fluidized bed reactor, including the pressure drop contributed by any particulate flow device such as an "L" valve ("Delta P tot"). For the particulate material being used, there also must be determined the pressure drop per unit of length of the standpipe, at minimum fluidization conditions ("Delta P/Lmf"), which can be determined by experiments in a laboratory scale standpipe. Therefore, the minimum length ("Lm") of the standpipe can be calculated with the following formula:

$$Lm = \frac{\text{Delta } P \text{ tot}}{0.75 \times \text{Delta } P/Lmf}$$

Note that the factor of 0.75 is used because it is desired to maintain the particulate material in nonfluidized condition, i.e., in packed bed mode. Also if desired, the calculated Lm can be increased by about 10–20 percent as a safety factor.

Other Parameters

The process of this invention is especially useful when the ratio of (a) the absolute pressure where the standpipe enters the fluidized bed reactor to (b) the absolute pressure where the particulate material enters the standpipe is at least about 1.5, preferably at least 2.0, and most preferably about 3. A preferred ratio is about 3–4.3:1.

Also, the process of this invention is especially useful when the minimum fluidization velocity for the particulate material being used is about 0.05–0.5 feet per second, and preferably about 0.1–0.3 feet per second.

The process of this invention is also especially useful when a mixture of two or more different particulate materials is used.

EXAMPLE

Reference is made to FIG. 1, which was used for the processing described in Example 1.

With reference to FIG. 1, a coke/ore mixture 1 consisting of 20 weight percent particulate petroleum coke and 80 weight percent particulate $TiO_2$ ore was fed via conduit 3 to a cyclone 2 at a rate of about 11,000 pounds per hour. The bulk density of such mixture was about 125 pounds per cubic foot. The particle size of the coke/ore mixture was about 90–3500 microns and the mean particle size was about 250 microns. The coke/ore mixture 1 was entrained in air and was fed by a vacuum blower (not shown) to the cyclone 2 at a velocity of about 58 feet per second. The cyclone 2 had an elevation of about 95 feet, and the pressure in the cyclone was about 10.5 pounds per square inch absolute ("psia")

The coke/ore mixture 1 was fed by gravity flow via mixing/aeration upper fluidized bed 5. The diameter of the mixing/aeration upper fluidized reactor 5 was 12 inches, and its height was 6 feet. Excess air 33 from the mixing aerating fluidized bed 5 and the cyclone 2 exits via conduits 6 and 7. A valve 8 can be opened or closed to adjust the amount of excess air 33 exiting the mixing/aeration fluidized bed 5.

The coke ore mixture 1 exits the mixing/aeration upper fluidized bed reactor 5 via a 4 inch diameter standpipe 9. The standpipe 9 is vertical except for (a) a sloped section, which is at an angle of about 22½ degrees from the vertical, and (b) a short horizontal section. Air 10C at the rate of about 2.5 standard cubic feet per minute ("SCFM"), having a pressure of about 45 pounds per square inch gage ("psig") and a velocity of about 2.5 feet per second, was injected via conduit 11 into standpipe 9. This caused the gas to flow controllably around the L-Valve. The coke/ore mixture 1 in the standpipe 9 flowed downward in packed bed flow. A motorized valve 12 can be used to regulate the amount of air fed to the standpipe 9. An "L" valve 13 (i.e., a right angle bend) is located at the lower end of standpipe 9.

Air 10A and 10B is also injected into standpipe 9 via conduits 26 and 27. The injection can be automated as follows: Conduits 26 and 27 can have motorized valves 28 and 29. The amount of air 10A and 10B injected through conduits 26 and 27 preferably should be in an amount sufficient to cause the relative gas-solids velocity in the standpipe to be about 20–80 percent of the minimum fluidization velocity for the coke/ore mixture. Such minimum fluidization velocity is approximately equivalent to the minimum fluidization velocity for the coke/ore mixture 1 in mixing/aeration upper fluidized bed 5. The differential pressure determined by detector 19, during fluidization conditions in mixing/aeration upper fluidized bed 5, divided by the length over which such differential pressure is measured ("DP/Lmf"), is the control signal for such minimum fluidization velocity. Therefore, a control signal that is 20–80% of the DP/Lmf ("MF Control Specification") can be used to maintain 20–80% of the minimum fluidization velocity in standpipe 9. So, during operation when controller 30 senses that the differential pressure read out by detector 21 or 22 divided by the length over which such differential pressure is measured ("DP/$L_{21}$" or "DP/$L_{22}$"), as the case may be, is not within the MF Control Specification, then controller 30 sends a signal to motorized valve 28 or 29, as the case may be, and such valve is opened or closed, as required, to bring the DP/$L_{21}$ or DP/$L_{22}$, as the case may be, to within the MF Control Specification.

A control system, which can maintain the desired level of the coke/ore mixture 1 in mixing aeration upper fluidized bed 5, was used for the apparatus utilized in Example 1. In this regard, when the coke/ore mixture 1 in mixing/aeration upper fluidized bed reactor 5 has the desired height, the differential pressure read out by detector 18 divided by the length over which such differential pressure is measured is observed and becomes the Bed Height Control Specification. Therefore, during operation, when controller 31 senses that the differential pressure read out by detector 18 divided by the length over which such differential pressure is measured ("DP/$L_{18}$") is less than or more than the Bed Height Control Specification, then a signal is sent by controller 31 to motorized valve 12, which is then adjusted by opening or closing, as required, which will increase or decrease the air 10C flow rate into standpipe 9, via conduit 11, until the DP/$L_{18}$ sensed by detector 18 is within the Bed Height Control Specification. Such adjustment will then reestablish the desired level of fluidized coke ore mixture 1 in upper mixing/aeration fluidized bed 5.

The coke/ore mixture 1 was fed to a 36 inch diameter, simulated, fluidized bed reactor 14 via the horizontal section of the standpipe 9. Fluidizing air 15 was injected via conduit 16 at a velocity of about 0.6 feet per second, and in an amount of about 645 SCFM into simulated fluidized bed reactor 14. The pressure above the surface of the fluidized coke/ore mixture 1 in the simulated fluidized bed reactor 14 was about 22.5 psig. Excess air 34 exits simulated fluidized bed reactor 14 via conduit 17.

Air 10D, at the rate of about 1.1 SCFM, was fed into the horizontal section of standpipe 9 via conduit 33 to help prevent surging of the coke/air mixture 1. Simulated product 35 exited the simulated fluidized bed reactor 14 via 6 inch conduit 36.

Note that if it is desired to stop the downward flow of the coke/ore mixture 1, air 10C, having suitable pressure, can be fed via conduit 11 to standpipe 9 to form a pressure seal and prevent the coke/ore mixture in fluidized bed 14 from backing up the standpipe 9.

The differential pressure in various sections of the equipment used in Example 1 was determined by detectors 18, 19, 20, 21, 22, 23, 24, and 25. The differential pressure, length over which the differential pressure was measured, and the ratio of such differential to such length are set forth below in TABLE 1.

TABLE 1

| Detector | Length of Section Over Which Differential Pressure Was Measured (Feet) | Differential Pressure (psi) | Ratio of Differential Pressure (psi)/ Length (feet) |
| --- | --- | --- | --- |
| 18 | 5.4 | 1.08 | 0.2 |
| 19 | 1.0 | 0.77 | 0.77 |
| 20 | 14.0 | 5.60 | 0.40 |
| 21 | 17.5 | 5.40 | 0.32 |
| 22 | 15.5 | 10.10 | 0.65 |
| 23 | 16.5 | 8.60 | 0.52 |
| 24 | 1.0 | 1.62 | 1.62 |
| 25 | 3.0 | 1.66 | 0.55 |

It was found that the above-described process was able to feed 11,000 pounds per hour of the coke/ore mixture 1, substantially in packed bed mode, while injecting only about 2.7 standard cubic feet per minute of air into the simulated fluidized bed reactor 14. The injected air was in an amount sufficient to decrease the relative gas-solids velocity in the standpipe so that fluidization of the particulate material is prevented. In addition, neither pneumatic feed nor a mechanical feed device (such as a pressure screw feeder) was needed to inject the coke/ore mixture 1 into the simulated fluidized bed 14.

We claim:

1. A process for feeding Geldart Type B particulate material to a fluidized bed reactor comprising:

(a) feeding the particulate material to a device that mixes and aerates the particulate material;

(b) passing the particulate material downward in packed bed mode from the device of step (a) into a fluidized bed reactor operated at greater than atmospheric pressure through a standpipe wherein the ratio of the absolute pressure where the standpipe enters the fluidized bed reactor to the absolute pressure where the particulate material enters the standpipe is at least about 1.5, and said standpipe has a bend before the particulate material is introduced into the fluidized bed reactor, said bend having an angle greater than the angle of repose of the particulate material; and (c) injecting gas into the standpipe at one or more locations before the bend in the standpipe, and injecting the gas into the standpipe at a velocity which is about 20–80 percent of the minimum fluidization velocity of the particulate material.

2. The process of claim 1 wherein the device in step (a) is a fluidized bed, and the bend in the standpipe is at an angle of about 90 degrees, said gas is injected at two or more locations before the bend in the standpipe, at least one location for injecting gas being upstream of said bend a distance no more than the inside diameter of the standpipe.

3. The process of claim 1 wherein the particle size of the particulate material is about 1–5000 microns, provided that if particulate material is used having a size of about 1–50 microns, then it does not exceed about 50 percent by weight of the total amount of particulate material.

4. The process of claim 1 wherein the particulate material is a blend of coke and TiO$_2$ source material.

5. The process of claim 2 wherein:

gas is injected into the fluidized bed device in step (a) which does not exceed about 500 percent of the minimum fluidization velocity of the particulate material; and the desired height of the particulate material in the fluidized bed device in step (a) is maintained by a control signal that is about the quotient of (i) the differential pressure between the top and bottom of such fluidized bed device in step (a) divided by (ii) the length over which such differential pressure is measured.

6. The process of claim 1 wherein:

the device in step (a) is a fluidized bed;

the mean particle size of the particulate material is about 100–500 microns; and the velocity of the gas being injected into the fluidized bed device in step (a) does not exceed about 500 percent of the minimum fluidization velocity of the particulate material.

7. The process of any one of claims 2, 3–5, 6 wherein the amount of the injected gas is adjusted by a control signal that reflects about 20–80 percent of the quotient of (1) the differential pressure between the top and bottom of the fluidized particulate material in the fluidized bed device in step (a) divided by (2) the height of such fluidized particulate material in the fluidized bed device of step (a).

* * * * *